(12) United States Patent
Bourne (10) Patent No.: US 9,115,841 B2
(45) Date of Patent: Aug. 25, 2015

(54) APPARATUS FOR SEALING A CONDUIT

(75) Inventor: Colin Bourne, Lloydminster (CA)

(73) Assignee: TREADSTONE OILFIELD SERVICES LTD. (CA)

( * ) Notice: Subject to any disclaimer, the term of this patent is extended or adjusted under 35 U.S.C. 154(b) by 0 days.

(21) Appl. No.: 14/126,202

(22) PCT Filed: Feb. 16, 2012

(86) PCT No.: PCT/CA2012/000143
§ 371 (c)(1),
(2), (4) Date: Feb. 6, 2014

(87) PCT Pub. No.: WO2013/120161
PCT Pub. Date: Aug. 22, 2013

(65) Prior Publication Data
US 2014/0182729 A1    Jul. 3, 2014

(51) Int. Cl.
*F16L 55/10* (2006.01)
*F16L 55/168* (2006.01)
*F16L 55/132* (2006.01)

(52) U.S. Cl.
CPC ............ *F16L 55/168* (2013.01); *F16L 55/132* (2013.01)

(58) Field of Classification Search
USPC ..................................................... 138/89, 94
See application file for complete search history.

(56) References Cited

U.S. PATENT DOCUMENTS

| 2,177,916 | A | * | 10/1939 | Thomas et al. | 138/90 |
| 2,390,461 | A | | 12/1945 | Racz | |
| 2,690,612 | A | | 10/1954 | Scott | |
| 2,867,243 | A | | 1/1959 | Bowan | |
| 3,032,069 | A | | 5/1962 | Ficklin | |
| 3,140,730 | A | * | 7/1964 | Costes | 376/203 |
| 3,541,858 | A | * | 11/1970 | Bonczek | 73/747 |
| 3,841,355 | A | | 10/1974 | Laner | |
| 4,597,147 | A | | 7/1986 | Henry | |
| 5,024,079 | A | | 6/1991 | Dufort | |
| 5,038,818 | A | | 8/1991 | Jiles | |
| 5,168,902 | A | * | 12/1992 | Hood | 138/89 |
| 5,363,881 | A | * | 11/1994 | Larkin | 138/89 |
| 5,592,965 | A | | 1/1997 | Rakieski | |
| 5,884,668 | A | * | 3/1999 | Larkin | 138/89 |
| 5,960,826 | A | | 10/1999 | Hebblethwaite et al. | |
| 6,257,266 | B1 | * | 7/2001 | Valdez | 137/15.08 |
| 6,446,662 | B1 | * | 9/2002 | Wagner | 137/318 |
| 6,508,274 | B2 | * | 1/2003 | Street | 138/89 |
| 6,581,620 | B2 | | 6/2003 | Babcock et al. | |
| 6,755,216 | B1 | | 6/2004 | Mostala | |
| 7,225,836 | B2 | * | 6/2007 | Field | 138/89 |
| 8,037,904 | B2 | * | 10/2011 | Carnevali | 138/89 |
| 2004/0074549 | A1 | * | 4/2004 | Allen | 138/89 |

FOREIGN PATENT DOCUMENTS

| EP | WO2010112067 | 10/2010 |
| FR | 2566873 | 1/1986 |
| FR | 2670558 | 6/1992 |

* cited by examiner

*Primary Examiner* — James Hook
(74) *Attorney, Agent, or Firm* — Terrence N. Kuharchuk; Rodman & Rodman (57) ABSTRACT

An apparatus and a method for sealing a conduit. The apparatus includes a housing, a tube for reciprocably extending through the housing bore, a rod reciprocably extending through the tube, a seal assembly associated with the tube and the rod, wherein the seal assembly includes at least one seal element which expands radially in response to an axial setting force, a proximal collar associated with the tube for engaging with a proximal end of the seal assembly, and a distal collar associated with the rod for engaging with a distal end of the seal assembly, wherein moving the rod axially relative to the tube in a proximal direction results in the axial setting force being applied to the seal assembly. The method includes using the apparatus to perform maintenance or repair on the conduit or its associated fittings.

21 Claims, 6 Drawing Sheets

APPARATUS FOR SEALING A CONDUIT

TECHNICAL FIELD

An apparatus for sealing a conduit in order to facilitate maintenance or repair of the conduit or its associated fittings.

BACKGROUND OF THE INVENTION

Conduits such as pipes frequently contain fluids, which may be at a pressure greater than ambient pressure. The fluids and the pressure may be maintained within a conduit by one or more fittings such as valves which are associated with the conduit. If such fittings are removed or become compromised, leakage of fluid and/or pressure from the conduit may result.

A conduit as described above may be associated with any source of fluid and/or pressure. In some circumstances, the conduit may be in fluid communication with a storage tank, such as an oil storage tank, so that the fluid in the conduit originates from the storage tank and the pressure in the conduit is due to the pressure head of the fluid within the storage tank.

In order to perform maintenance or repair on the conduit or its associated fittings, it is desirable to avoid a loss of fluid and/or pressure from the conduit.

A first option is to remove the source of fluid and/or pressure by disconnecting the conduit from the source of fluid and/or pressure or by draining a storage tank to which the conduit may be connected. This first option may be effective in eliminating or reducing fluid and/or pressure leakage, but is potentially time consuming, inconvenient and expensive, since it may require temporarily removing equipment from operation while the conduit is maintained or repaired.

A second option is to seal the conduit upstream of the location at which the maintenance or repair is taking place so that the location of maintenance or repair is isolated from the fluid and/or pressure. This second option typically requires a seal assembly which may be delivered through the conduit to a position upstream of the location of maintenance or repair and which can be selectively actuated to temporarily seal the conduit at the desired position.

Apparatus and methods exist which enable a seal assembly to be inserted into the conduit at a position downstream of the location of maintenance or repair, to be moved upstream past the location of maintenance or repair, and to be selectively actuated to temporarily seal the conduit upstream of the location of maintenance or repair. Once the maintenance or repair is completed, the seal assembly may be selectively actuated to unseal the conduit and the seal assembly may be removed from the conduit.

Examples of such apparatus and methods may be found in U.S. Pat. No. 2,690,612 (Scott), U.S. Pat. No. 2,867,243 (Bowan), U.S. Pat. No. 3,841,355 (Laner), U.S. Pat. No. 4,597,147 (Henry), U.S. Pat. No. 5,592,965 (Rakieski), U.S. Pat. No. 6,581,620 (Babcock et al), U.S. Pat. No. 6,755,216 (Mostala), France Patent Application Publication No. FR2566873 A1 (Keriolet), France Patent Application Publication No. FR2670558 (Gillodts), and PCT International Publication No. WO 2010/112067 A1 (Ornetzeder).

Of the above apparatus and methods, U.S. Pat. No. 4,597,147 (Henry) and U.S. Pat. No. 5,592,965 (Rakieski) contemplate some of the challenges which exist in designing an apparatus which is capable of being passed through a fitting such as a valve and which may be used with valves having valve ports of varying geometries.

There remains a need for apparatus and methods for sealing a conduit to facilitate maintenance or repair of the conduit or its associated fittings, wherein the apparatus includes a seal assembly which may be introduced into the conduit from a position downstream of the location of maintenance or repair, which may be moved upstream past the location of maintenance or repair, which may be selectively actuated to temporarily seal the conduit upstream of the location of maintenance or repair, and which may be selectively actuated to unseal the conduit after completion of the maintenance or repair so that the seal assembly can be removed from the conduit.

SUMMARY OF THE INVENTION

References in this document to orientations, to operating parameters, to ranges, to lower limits of ranges, and to upper limits of ranges are not intended to provide strict boundaries for the scope of the invention, but should be construed to mean "approximately" or "about" or "substantially", within the scope of the teachings of this document, unless expressly stated otherwise.

The present invention is directed at an apparatus and a method for sealing a conduit in order to facilitate maintenance or repair of the conduit and/or its associated fittings.

The apparatus of the invention comprises a housing defining a housing bore, a tube extending through the housing bore and defining a tube bore, a rod extending through the tube bore, a seal assembly associated with the tube and the rod, a proximal collar associated with the tube for engaging with a proximal end of the seal assembly and a distal collar associated with the rod for engaging with a distal end of the seal assembly.

In some embodiments, the seal assembly may be comprised of a single seal element. In some embodiments, the seal assembly may be comprised of a plurality of seal elements. In some embodiments, the seal element or plurality of seal elements may expand radially in response to an axial setting force being applied thereto.

In an exemplary apparatus aspect, the invention is an apparatus for sealing a conduit comprising:
(a) a housing, the housing defining a housing bore and having a housing proximal end and a housing distal end, wherein the housing distal end is adapted to be connectable with a fitting associated with the conduit;
(b) a tube for reciprocably extending through the housing bore, the tube defining a tube bore and having a tube proximal end and a tube distal end;
(c) a rod reciprocably extending through the tube bore, the rod having a rod outer surface, a rod proximal end, and a rod distal end, wherein the housing bore, the tube and the rod define an axis of the apparatus, wherein the rod distal end protrudes from the tube distal end;
(d) a seal assembly slidably surrounding the rod outer surface between the tube distal end and the rod distal end, wherein the seal assembly is comprised of at least one seal element which expands radially in response to an axial setting force being applied thereto, the seal assembly having a seal assembly proximal end and a seal assembly distal end;
(e) a proximal collar associated with the tube distal end, for engaging with the seal assembly proximal end;
(f) a distal collar associated with the rod distal end, for engaging with the seal assembly distal end;
wherein moving the rod axially relative to the tube in a proximal direction results in the axial setting force being applied to the seal assembly by the proximal collar and the distal collar as the seal assembly is compressed between the proximal collar and the distal collar.

As used herein, "proximal" and "distal" are relative to a user of the apparatus. As one example, "proximal" means relatively close to the user and relatively removed from the fitting and/or conduit with which the apparatus is used, and "distal" means relatively removed from the user and relatively close to the fitting and/or conduit with which the apparatus is used. As a second example, moving in a "proximal direction" means moving toward the user and away from the fitting and/or conduit, and moving in a "distal direction" means moving away from the user and toward the fitting and/or conduit.

As used herein, "downstream" and "upstream" are relative to the source of fluid which is to be contained by using the apparatus. As one example, in the case of a conduit and/or fitting which are connected with a storage tank such as an oil storage tank, "downstream" means relatively removed from the source of fluid (i.e., the storage tank) and "upstream" means relatively close to the source of fluid (i.e., the storage tank).

The housing may be comprised of any suitable structure, device or apparatus which is capable of accommodating the tube within the housing bore and which is adapted to be connectable with a removable fitting. The housing may consist of a single component, or may be comprised of a plurality of components which are connected together.

The housing may be adapted to be connectable with a fitting in any manner which is suitable to facilitate a connection with the intended fitting. As non-limiting examples, the housing may be provided with external threads, internal threads, a flange, or a camlock coupling.

The housing bore defines two primary ports in the housing which facilitate passage of the tube through the housing bore and the housing. In some embodiments, the housing may further comprise one or more auxiliary ports which communicate with the housing bore. In some embodiments, the housing may further comprise valves which are associated with the auxiliary ports. The one or more auxiliary ports facilitate draining of the housing bore and/or introduction of fluids into the housing bore while the apparatus is connected with the conduit or its associated fitting.

In some embodiments, the housing may be further comprised of a packing in the housing bore for providing a seal between the housing and the tube when the tube is within the housing bore. The packing may be comprised of any suitable structure, device or apparatus which is effective to provide the seal while permitting reciprocation of the tube relative to the housing bore. In some embodiments, the housing may be further comprised of a packing ring in the housing bore for assisting in maintaining the packing within the housing bore.

The rod may be moved axially relative to the tube to apply the axial setting force in any suitable manner. As a first non-limiting example, in some embodiments, the rod and/or the tube may be provided with a jacking mechanism so that the axial setting force results directly from an axially exerted force. As a second non-limiting example, in some embodiments, the rod and/or the tube may be provided with threads so that the axial setting force results indirectly from turning the rod.

In some particular embodiments, the rod proximal end may be provided with threads and the apparatus may be further comprised of a nut which is threaded onto the rod proximal end and which abuts the tube proximal end, such that turning the nut moves the rod axially and thereby applies the axial setting force.

The seal assembly is comprised of at least one seal element. In some embodiments, the seal assembly may be comprised of a single seal element. In some embodiments, the seal assembly may be comprised of a plurality of seal elements.

In some embodiments, the plurality of seal elements may be comprised of a proximal seal element and a distal seal element. In some embodiments, the plurality of seal elements may be comprised of a proximal seal element, a distal seal element, and one or more intermediate seal elements located between the proximal seal element and the distal seal element.

In some embodiments, the single seal element or plurality of seal elements may be comprised of, may consist of, or may consist essentially of an elastomeric material. The elastomeric material may be any suitable natural and/or synthetic material which exhibits elastic properties. In some embodiments, the elastomeric material may be a natural and/or a synthetic rubber.

In some embodiments, the plurality of seal elements may be comprised of an elastomeric proximal seal element and an elastomeric distal seal element.

The single seal element or plurality of seal elements each have an unexpanded minimum diameter and an expanded maximum diameter. The unexpanded minimum diameter is the minimum diameter of the seal element when no axial setting force is applied to the seal element. The expanded maximum diameter is the maximum diameter of the seal element when a maximum axial setting force is applied to the seal element.

The ratio between the expanded maximum diameter and the unexpanded minimum diameter of a seal element may be described as an expansion ratio. In embodiments in which the seal assembly is comprised of a plurality of seal elements, the unexpanded minimum diameter of each of the seal elements may be the same or some or all of the seal elements may have different unexpanded minimum diameters. In embodiments in which the seal assembly is comprised of a plurality of seal elements, the expanded maximum diameter of each of the seal elements may be the same or some or all of the seal elements may have different expanded maximum diameters. In embodiments in which the seal assembly is comprised of a plurality of seal elements, the expansion ratios of each of the seal elements may be the same or some or all of the seal elements may have different expansion ratios.

In some embodiments in which the seal assembly is comprised of a plurality of seal elements, the expansion ratio for the proximal seal element and/or the distal seal element may be greater than about 1.4:1. In some embodiments in which the seal assembly is comprised of a plurality of seal elements, the expansion ratio for the proximal seal element and/or the distal seal element may be greater than about 1.5:1.

The unexpanded minimum diameter may be any diameter which will facilitate passing the seal element through the smallest dimension which will be encountered by the seal element during use of the apparatus. The expanded maximum diameter may be any diameter which will facilitate sealing of the largest conduit which will be required to be sealed by the seal element during use of the apparatus.

In some embodiments, the unexpanded minimum diameter of the single seal element, the proximal seal element and/or the distal seal element may be no greater than about 2.75 inches (about 7 centimeters). In some embodiments, the unexpanded minimum diameter of the single seal element, the proximal seal element and/or the distal seal element may be no greater than about 3.125 inches (about 8 centimeters). In some embodiments, the unexpanded minimum diameter of the single seal element, the proximal seal element and/or the distal seal element may be no greater than about 3.5 inches (about 9 centimeters).

In some embodiments, the expanded maximum diameter of the single seal element, the proximal seal element and/or the distal seal element may be at least about 4 inches (about 10 centimeters). In some embodiments, the expanded maximum diameter of the single seal element, the proximal seal element and/or the distal seal element may be at least about 4.375 inches (about 11 centimeters).

Each seal element has a seal element length. In embodiments in which the seal assembly is comprised of a plurality of seal elements, the seal element length of each of the seal elements may be the same or some or all of the seal elements may have different seal element lengths. The seal element length of a seal element may be less than, equal to, or greater than the unexpanded minimum diameter and/or the expanded maximum diameter of the seal element. In some embodiments, a seal element may have a seal element length which is greater than the unexpanded minimum diameter of the seal element. In some embodiments, a seal element may have a seal element length which is greater than the unexpanded minimum diameter of the seal element.

In embodiments in which the seal assembly is comprised of a plurality of seal elements, the seal elements are arranged end to end in the seal assembly. The seal assembly may be configured so that the proximal seal element is adjacent to the distal seal element. Alternatively, the seal assembly may be configured so that the proximal seal element and the distal seal element are separated by one or more intermediate seal elements.

In some embodiments in which the seal assembly is comprised of a plurality of seal elements, a seal element may contact its adjacent seal element or seal elements. In some embodiments in which the seal assembly is comprised of a plurality of seal elements, the seal assembly may be further comprised of one or more spacers. The one or more spacers may be positioned between some or all of the seal elements. In some embodiments, more than one spacer may be positioned between two seal elements. In some particular embodiments, the seal assembly may be further comprised of a spacer positioned between the proximal seal element and the distal seal element.

Each of the spacers has a spacer diameter. The spacer diameter of each of the spacers may be the same or some or all of the spacers may have different spacer diameters. The spacer diameters may be any diameter which will facilitate passing the spacer through the smallest dimension which will be encountered by the spacer during use of the apparatus.

The spacer diameter may be less than, equal to or greater than the unexpanded minimum diameter of the seal elements. In some particular embodiments, the spacer embodiment may be less than the unexpanded minimum diameter of each of the proximal seal element and the distal seal element.

In some embodiments, the spacer diameter of each of the spacers may be between about 2.375 inches (about 6 centimeters) and about 3.125 inches (about 8 centimeters). In some embodiments, the spacer diameter of each of the spacers may be between about 2.375 inches (about 6 centimeters) and about 2.75 inches (about 7 centimeters). In some embodiments, the spacer diameter of each of the spacers may be between about 2.375 inches (about 6 centimeters) and less than about 2.75 inches (about 7 centimeters).

In embodiments in which the seal assembly is comprised of a single seal element, the materials and dimensions which are suitable for a seal assembly comprising a plurality of seal elements may also be suitable for a seal assembly comprising a single seal element. In embodiments in which the seal assembly is comprised of a single seal element, the spacer may be omitted from the seal assembly.

Each of the proximal collar and the distal collar may be comprised of any structure, device or apparatus which is capable of engaging with the seal assembly in order to apply the axial setting force to the seal assembly. The proximal collar and the distal collar may be identical or substantially identical, or may be comprised of different structures, devices or apparatus. The proximal collar and the distal collar may consist of a single component, or may be comprised of a plurality of components which are connected together.

The proximal collar may be associated with the tube distal end in any suitable manner. In some embodiments, the proximal collar may be welded to the tube distal end.

The distal collar may be associated with the rod distal end in any suitable manner. In some embodiments, the distal collar may be welded to the rod distal end.

In some embodiments, the proximal collar may have a proximal collar outer surface. In some embodiments, at least a portion of the proximal collar outer surface may be textured in order to inhibit the seal assembly from passing over the proximal collar. In some embodiments, the distal collar may have a distal collar outer surface. In some embodiments, at least a portion of the distal collar outer surface may be textured in order to inhibit the seal assembly from passing over the distal collar.

The proximal collar outer surface and/or the distal collar outer surface may be textured in any suitable manner. In some embodiments, the texturing may be provided by helical threads in the proximal collar outer surface and/or the distal collar outer surface.

In some embodiments, substantially the entire proximal collar outer surface and substantially the entire distal collar outer surface may be textured. In some embodiments in which only a portion of the proximal collar outer surface and/or the distal collar outer surface are textured, the portion of the proximal collar outer surface and/or the portion of the distal collar outer surface closest to the seal assembly may be textured.

In some embodiments, the proximal collar may be comprised of a proximal collar flange which extends radially from the proximal collar outer surface in order to inhibit the seal assembly from passing over the proximal collar. In some embodiments, the distal collar may be comprised of a distal collar flange which extends radially from the distal collar outer surface in order to inhibit the seal assembly from passing over the distal collar.

The proximal collar may have a proximal collar proximal end and a proximal collar distal end. The proximal collar flange may be positioned at any location on the proximal collar. In some embodiments, the proximal collar flange may be positioned between the proximal collar proximal end and the proximal collar distal end. In some embodiments, the proximal collar flange may be positioned approximately an equal distance from both the proximal collar proximal end and the proximal collar distal end.

The distal collar may have a distal collar proximal end and a distal collar distal end. The distal collar flange may be positioned at any location on the distal collar. In some embodiments, the distal collar flange may be positioned between the distal collar proximal end and the distal collar distal end. In some embodiments, the distal collar flange may be positioned approximately an equal distance from both the distal collar proximal end and the distal collar distal end.

The proximal collar flange has a proximal collar flange diameter and the distal collar flange has a distal collar flange diameter. The proximal collar flange diameter and the distal collar flange diameter may be any diameter which will facilitate passing the proximal collar and the distal collar through the smallest dimension which will be encountered by the proximal collar and the distal collar during use of the apparatus.

The proximal collar flange diameter and the distal collar flange diameter may be less than, equal to or greater than the unexpanded minimum diameters of the seal elements.

In some particular embodiments in which the seal assembly is comprised of a single seal element, the proximal collar flange diameter may be no greater than the unexpanded minimum diameter of the seal element. In some particular embodiments in which the seal assembly is comprised of a single seal element, the proximal collar flange diameter may be about equal to the unexpanded minimum diameter of the seal element.

In some particular embodiments in which the seal assembly is comprised of a single seal element, the distal collar flange diameter may be no greater than the unexpanded minimum diameter of the seal element. In some particular embodiments in which the seal assembly is comprised of a single seal element, the distal collar flange diameter may be about equal to the unexpanded minimum diameter of the seal element.

In some particular embodiments in which the seal assembly is comprised of a plurality of seal elements, the proximal collar flange diameter may be no greater than the unexpanded minimum diameter of the proximal seal element. In some particular embodiments in which the seal assembly is comprised of a plurality of seal elements, the proximal collar flange diameter may be about equal to the unexpanded minimum diameter of the proximal seal element.

In some particular embodiments in which the seal assembly is comprised of a plurality of seal elements, the distal collar flange diameter may be no greater than the unexpanded minimum diameter of the distal seal element. In some particular embodiments in which the seal assembly is comprised of a plurality of seal elements, the distal collar flange diameter may be about equal to the unexpanded minimum diameter of the distal seal element.

In embodiments in which the proximal collar does not include a proximal collar flange extending radially from the proximal collar outer surface and the distal collar does not include a distal collar flange extending radially from the distal collar outer surface, the dimensions stated for the proximal collar flange diameter and the distal collar flange diameter may apply to the proximal collar outer surface and the distal collar outer surface respectively.

In the use of the apparatus of the invention, the housing may be connected with a downstream end of a conduit or fitting, following which the tube and the rod may be advanced upstream through the conduit or fitting so that the conduit or fitting can be sealed at an upstream portion of the conduit or fitting. The apparatus of the invention is particularly suited for use with conduits and/or fittings which include a relatively smaller diameter downstream portion and a relatively larger diameter upstream portion, since such conduits and/or fittings may require a sealing assembly which provides a relatively large expansion ratio.

In some embodiments, the apparatus of the invention may be used to change a valve associated with a conduit. In such embodiments, the housing may be connected directly or indirectly with a downstream outlet port of the valve, the tube and the rod may be advanced through the valve, through an upstream inlet port of the valve into the conduit, and the axial setting force can then be applied in order to enable the seal assembly to seal the conduit.

As a non-limiting example, in some particular embodiments, a downstream outlet port of a valve may have a diameter of about 2.75 inches (about 7 centimeters) and a conduit which is connected with an upstream inlet port of the valve may have a diameter of about 4 inches (about 10 centimeters). As a result, in such circumstances, a sealing assembly must provide an unexpanded minimum diameter of no greater than about 2.75 inches (about 7 centimeters) and must provide an expanded maximum diameter of at least about 4 inches (about 10 centimeters), or an expansion ratio slightly greater than about 1.4:1. Such an expansion ratio is feasible using the apparatus of the invention, particularly as a result of the features of the seal assembly, the proximal collar, and the distal collar.

BRIEF DESCRIPTION OF DRAWINGS

Embodiments of the invention will now be described with reference to the accompanying drawings, in which.

DETAILED DESCRIPTION

The present invention is directed at an apparatus for sealing a conduit in order to facilitate maintenance and/or repair of the conduit and/or its associated fittings.

A non-limiting exemplary embodiment of the apparatus is depicted in FIGS. 1-9. In the exemplary embodiment, the apparatus (20) may be used to replace a fitting such as a valve (22) which is associated with a conduit (24). The conduit (24) is in fluid communication with a source of fluid. The source of fluid may be a storage tank, such as an oil storage tank (not shown). The fitting, the conduit (24) and the source of fluid do not form part of the invention.

Figure 1:
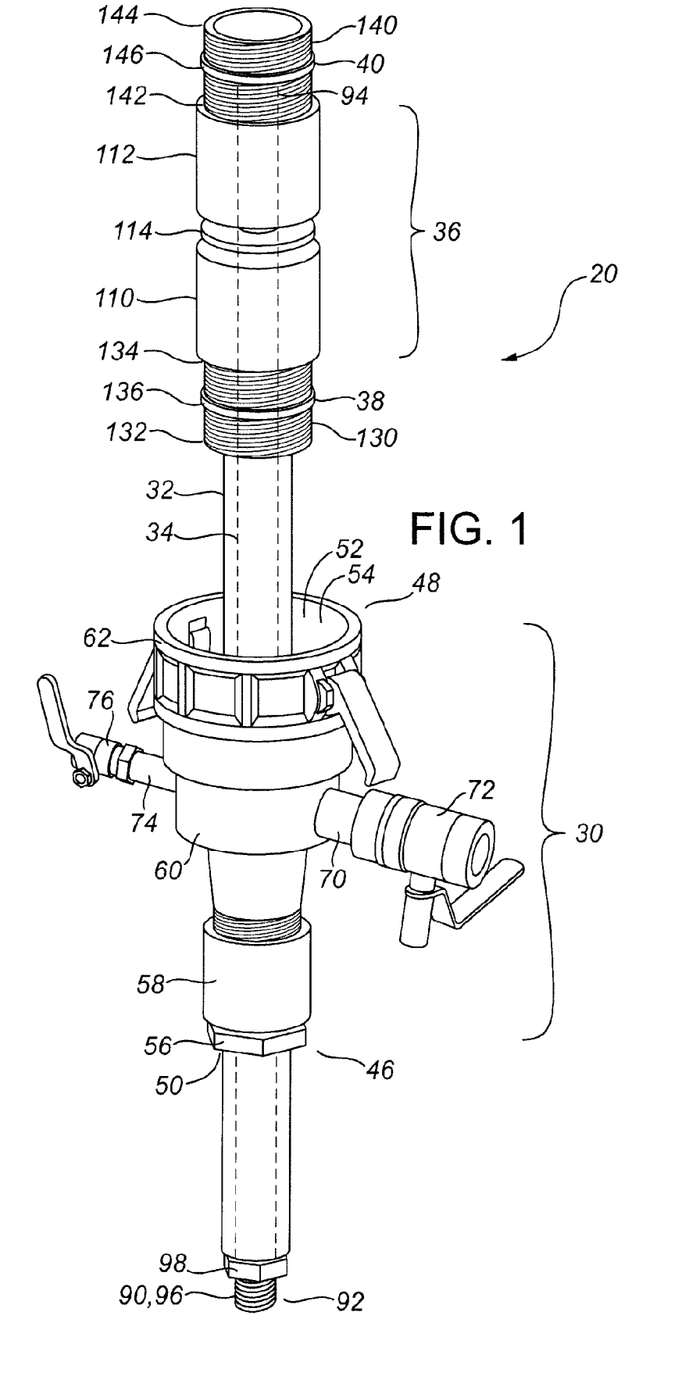
FIG. 1 is a pictorial view of an apparatus in accordance with an exemplary embodiment of the apparatus of the invention, in which the tube assembly is shown advanced through the housing bore in the distal direction.
Figure 2:
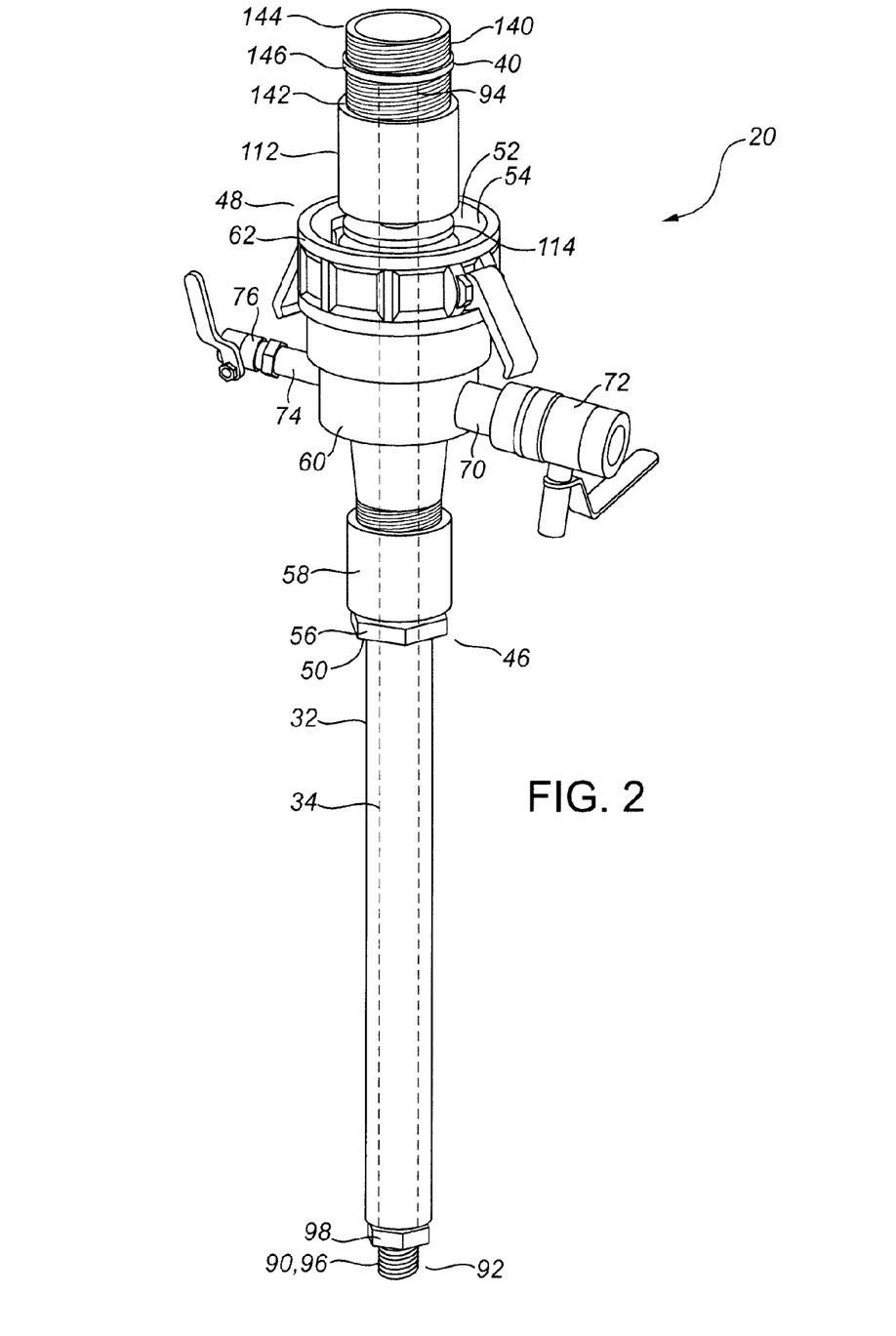
FIG. 2 is a pictorial view of the exemplary embodiment of the apparatus depicted in FIG. 1, in which the tube assembly is shown retracted through the housing bore in the proximal direction.
Figure 3:
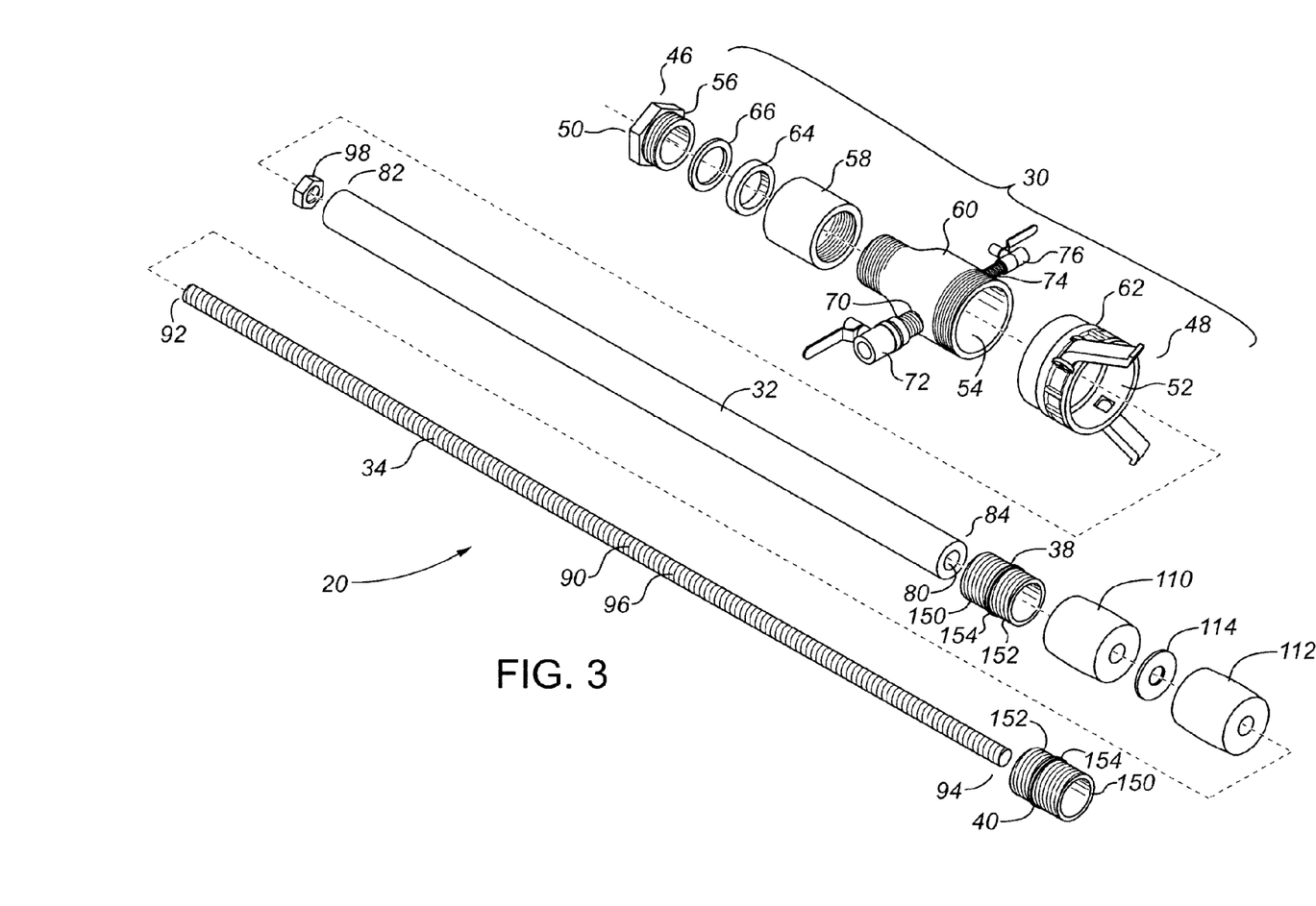
FIG. 3 is an exploded pictorial view of the exemplary embodiment of the apparatus depicted in FIG. 1, showing the components of the apparatus unassembled.

Referring to FIGS. 1-3, the apparatus (20) is comprised of a housing (30), a tube (32), a rod (34), a seal assembly (36), a proximal collar (38) and a distal collar (40).

The housing (30) has a housing proximal end (46) and a housing distal end (48). A housing bore (54) extends through the housing (30) from the housing proximal end (46) to the housing distal end (48), thereby defining a housing proximal primary port (50) at the housing proximal end (46) and a housing distal primary port (52) at the housing distal end (48).

In the exemplary embodiment, the housing (30) is constructed from a plurality of components which are temporarily or permanently connected together. Moving from the housing proximal end (46) toward the housing distal end (48), the housing (30) is comprised of a hexagonal plug (56), a packing coupling (58), a crossover coupling (60), and a camlock coupling (62).

In the exemplary embodiment, the camlock coupling (62) is selected to be compatible with a complementary camlock coupling (26) on or connected with the valve (22) so that the housing (30) is thereby adapted to be connectable with the valve (22). In the exemplary embodiment, the camlock coupling (62) may have a nominal diameter of about 4 inches (about 10 centimeters). In other embodiments, the camlock coupling (62) may be substituted with an alternative form of coupling which is compatible with the conduit and its associated fitting such as, by way of non-limiting examples, external threads, internal threads or a flange.

In the exemplary embodiment, the crossover coupling (60) provides a transition between the relatively larger diameter of the camlock coupling (62) and the relatively smaller diameter of the packing coupling (58). In the exemplary embodiment, the crossover coupling (60) is welded to both the camlock coupling (62) and the packing coupling (58).

In the exemplary embodiment, the packing coupling (58) contains a suitable packing (64) and a packing ring (66). The packing (64) provides a seal between the housing (30) and the tube (32). The packing ring (66) abuts the packing (64) and assists in maintaining the packing (64) in place inside the packing coupling (58). In the exemplary embodiment, the packing (64) consists of Teflon (trade-mark), which allows the tube (32) to slide smoothly through the packing coupling (58) while maintaining the seal between the housing (30) and the tube (32). In the exemplary embodiment, the packing ring (66) is an annular steel washer. Interior threads are provided in the packing coupling (58) to accommodate the hexagonal plug (56). In the exemplary embodiment, the packing coupling (58) may have an inner diameter of about 2 inches (about 5 centimeters) and the packing (64) may have a thickness of about 0.25 inches (about 0.6 centimeters).

In the exemplary embodiment, the hexagonal plug (56) includes exterior threads so that the hexagonal plug (56) can be threadably coupled with the packing coupling (58). When coupled with the packing coupling (58), the hexagonal plug (56) abuts the packing ring (66). As a result, the hexagonal plug (56) assists the packing coupling (58) in maintaining a seal between the housing (30) and the tube (32) by providing support for the packing ring (66) and containment of the packing (64) within the packing coupling (58). In the exemplary embodiment, the hexagonal plug (56) may have a nominal size of about 2 inches (about 5 centimeters) to fit within the packing coupling (58) and may have a 1.8 inch (about 4.5 centimeters) hole machined through it to accommodate the tube (32).

In the exemplary embodiment, the housing (30) further comprises a first auxiliary port (70) having a first auxiliary port valve (72) and a second auxiliary port (74) having a second auxiliary port valve (76). The auxiliary ports (70, 74) communicate with the housing bore (54). In the exemplary embodiment, the auxiliary ports (70, 74) are located on the crossover coupling (60) and the first auxiliary port (70) is larger than the second auxiliary port (74). More particularly, in the exemplary embodiment, the first auxiliary port (70) may have a nominal diameter of about 1 inch (about 2.5 centimeters) and the second auxiliary port (76) may have a nominal diameter of about 0.5 inches (about 1.3 centimeters).

In the exemplary embodiment, the tube (32) is hollow, and extends through the housing bore (54) when the apparatus (20) is assembled. The tube (32) is not fixed to the housing (30) and may therefore reciprocate within the housing bore (54). The tube (32) defines a tube bore (80) and has a tube proximal end (82) and a tube distal end (84). In the exemplary embodiment, the tube (32) may have an outer diameter of about 1.75 inches (about 4.4 centimeters) and the diameter of the tube bore (80) may be about 1.1 inches (about 2.8 centimeters) to accommodate the rod (34).

In the exemplary embodiment, the rod (34) is solid and has a rod outer surface (90), a rod proximal end (92) and a rod distal end (94). The rod (34) extends through the tube bore (80). The rod (34) is not fixed to the tube (32) and may therefore reciprocate within the tube bore (80). The rod (34) is longer than the tube (32) so that the rod proximal end (92) protrudes from the tube proximal end (82) and the rod distal end (94) protrudes from the tube distal end (84). In the exemplary embodiment, the rod (34) may have a diameter of about 1 inch (about 2.5 centimeters).

At least the rod proximal end (92) is provided with external threads (96). In the exemplary embodiment as depicted in FIGS. 1-9, substantially the entire rod outer surface (90) is provided with external threads (96). A threaded nut (98) with complementary internal threads is threadably connected with the rod (34) at the rod proximal end (92). The threaded nut (98) abuts the tube proximal end (82). The purpose of the threaded nut (98) is to enable an axial setting force to be applied to the seal assembly (36) by turning the threaded nut (98) and thereby advancing the threaded nut (98) toward the rod distal end (94) so that the rod (34) moves axially relative to the tube (32) in a proximal direction, and to enable the axial setting force to be released by retracting the threaded nut (98) toward the rod proximal end (92) so that the rod (34) moves axially relative to the tube (32) in a distal direction. The threaded nut (98) is sized to be compatible with the rod (34). In the exemplary embodiment the threaded nut (98) may have a nominal (inner) diameter of about 1 inch (about 2.5 centimeters) and a flat size of about 1.5 inches (about 3.8 centimeters).

The seal assembly (36) slidably surrounds the rod outer surface (90) between the tube distal end (84) and the rod distal end (94). The seal assembly (36) may be comprised of a single seal element or a plurality of seal elements. In the exemplary embodiment, the seal assembly 36 is comprised of a plurality of seal elements. In the exemplary embodiment, the seal assembly (36) is more particularly comprised of a proximal seal element (110), a distal seal element (112), and a spacer (114) positioned between the proximal seal element (110) and the distal seal element (112). Each of the components of the seal assembly 36 is capable of sliding along the rod outer surface (90) in order to facilitate actuation of the seal assembly (36).

The proximal seal element (110) has a proximal seal element length (116) and the distal seal element (112) has a distal seal element length (118). Each of the proximal seal element (110) and the distal seal element (112) has an unexpanded minimum diameter (120) and an expanded maximum diameter (122).

In the exemplary embodiment, the proximal seal element (110) and the distal seal element (112) are substantially identical, so that the proximal seal element length (116) is substantially equal to the distal seal element length (118), the unexpanded minimum diameter (120) of the seal elements (110, 112) is substantially equal, and the expanded maximum diameter (122) of the seal elements (110, 112) is substantially equal. In the exemplary embodiment, the proximal seal element (110) and the distal seal element (112) are both constructed of natural rubber. In particular, in the exemplary embodiment, it has been found that the proximal seal element (110) and the distal seal element (112) may each be constructed from a 4 inch (about 10 centimeter) natural rubber pipeline ball which has been machined to the appropriate dimensions.

In the exemplary embodiment, the lengths (116, 118) of the proximal seal element (110) and the distal seal element (112) respectively may be about 3.5 inches (about 9 centimeters), the unexpanded minimum diameter (120) of the seal elements (110, 112) may be about 2.75 inches (about 7 centimeters), and the expanded maximum diameter (122) of the seal elements (110, 112) may be about 4 inches (about 10 centimeters). As a result, in the exemplary embodiment, the seal assembly (36) may provide an expansion ratio of about 1.45:1.

The seal elements (110, 112) fit snugly around the rod outer surface (90) in order to provide a seal between the rod (34) and the seal elements (110, 112). Accordingly, in the exemplary embodiment in which the rod (34) may have a diameter of about 1 inch (about 2.5 centimeters), the seal elements (110, 112) may have an inner diameter of about 0.75 inches (about 1.9 centimeters) so that the seal elements (110, 112) must stretch to accommodate the rod (34).

In the exemplary embodiment, the spacer (114) is a flat metal washer, and functions to maintain separation between the seal elements (110, 112). In the exemplary embodiment in which the rod (34) may have a diameter of about 1 inch (about 2.5 centimeters) and in which the seal elements (110, 112) may have an unexpanded minimum diameter (120) of about 2.75 inches (about 7 centimeters), the spacer (114) may have an inner diameter of about 1.05 inches (about 2.7 centimeters) to accommodate the rod (34) and may have an outer diameter of about 2.5 inches (about 6.3 centimeters).

In the exemplary embodiment, the proximal collar (38) has a proximal collar outer surface (130), a proximal collar proximal end (132), a proximal collar distal end (134), and a proximal collar flange (136) extending radially from the proximal collar outer surface (130) at a position which is approximately midway between the proximal collar proximal end (132) and the proximal collar distal end (134). The proximal collar flange (136) has a proximal collar flange diameter (138), which is the outer diameter of the proximal collar flange (136).

In the exemplary embodiment, the distal collar (40) has a distal collar outer surface (140), a distal collar proximal end (142), a distal collar distal end (144), and a distal collar flange (146) extending radially from the distal collar outer surface (140) at a position which is approximately midway between the distal collar proximal end (142) and the distal collar distal end (144). The distal collar flange (146) has a distal collar flange diameter (148), which is the outer diameter of the distal collar flange (146).

In the exemplary embodiment, the proximal collar (38) and the distal collar (40) are substantially identical "mirror images" of each other. In other words, the proximal collar proximal end (132) corresponds with the distal collar distal end (144) and the proximal collar distal end (134) corresponds with the distal collar proximal end (142).

In the exemplary embodiment, each of the collars (38, 40) is constructed from a plurality of components which are welded together. These components consist of a first threaded collar (150), a second threaded collar (152) and a flange washer (154). In the exemplary embodiment, the first threaded collar (150) and the second threaded collar (152) are both EUE threaded pipe nipples and the flange washer (154) is a conventional steel washer. The threads on the exterior of the first threaded collar (150) and the second threaded collar (152) provide texturing to the collar outer surfaces (130, 140). The flange washers (154) provide the collar flanges (136, 146).

In the exemplary embodiment, the first threaded collar (150) may have an outer diameter of about 2.375 inches (about 6 centimeters), an inner diameter of about 2 inches (about 5 centimeters), and a length of about 1.2 inches (about 3 centimeters), the second threaded collar (152) may have an outer diameter of about 2.375 inches (about 6 centimeters), an inner diameter of about 2 inches (about 5 centimeters) and a length of about 0.9 inches (about 2.3 centimeters), and the flange washer (154) may have an outer diameter of about 2.75 inches (about 7 centimeters), an inner diameter of about 1.05 inches (about 2.7 centimeters), and a width or thickness of about 0.25 inches (about 0.6 centimeters).

In the exemplary embodiment, the proximal collar (38) is fixed to the tube distal end (84) and the distal collar (40) is fixed to the rod distal end (94).

In the exemplary embodiment, the proximal collar (38) may be assembled and fixed to the tube distal end (84) first, by welding the flange washer (154) to the tube distal end (84), second, by sliding the first threaded collar (150) over the tube (32) and welding the first threaded collar (150) to one side of the flange washer (154), and third, by welding the second threaded collar (152) to the other side of the flange washer (154).

In the exemplary embodiment, the distal collar (40) may be assembled and fixed to the rod distal end (94) first, by welding the flange washer (154) to the rod distal end (94), second, by sliding the second threaded collar (152) over the rod (34) and welding the second threaded collar (152) to one side of the flange washer (154), and third, by welding the first threaded collar (150) to the other side of the flange washer (154).

Since the proximal collar (38) is fixed to the tube distal end (84) and the distal collar (40) is fixed to the rod distal end (94), axial movement of the rod (34) relative to the tube (32) which is caused by turning the threaded nut (98) will result in the collars (38, 40) moving toward each other or away from each other (depending upon the direction that the threaded nut (98) is turned). If the rod (34) is moved relative to the tube (32) in a proximal direction so that the collars (38, 40) are moved toward each other, an axial setting force will be applied to the seal assembly (36) by the collars (38, 40) as the seal assembly (36) is compressed between the collars (38, 40). The axial setting force and compression of the seal assembly (36) will result in the seal elements (110, 112) expanding radially. If the rod (34) is moved relative to the tube (32) in a distal direction so that the collars (38, 40) are moved away from each other, the axial setting force will be gradually released and the seal elements (110, 112) will collapse radially.

Referring to FIGS. 4-9, in some applications the apparatus (20) of the exemplary embodiment may be used to change a fitting, such as a valve (22), which is removably connected with a conduit (24) leading from a storage tank, such as an oil storage tank (not shown). In such applications, it is desirable to have the ability to change the valve (22) without first draining the storage tank.

In some such applications, the valve (22) may have a relatively smaller diameter downstream outlet port (such as, for example about 2.75 inches (about 7 centimeters)), and the conduit (24) upstream of the valve (22) may have a relatively larger diameter (such as, for example about 4 inches (about 10 centimeters)), thereby requiring a seal assembly (36) which can provide an expansion ratio of at least about 1.4:1.

In such applications, the apparatus (20) of the exemplary embodiment may be used as follows, with reference to FIGS. 4-9.

Figure 4:
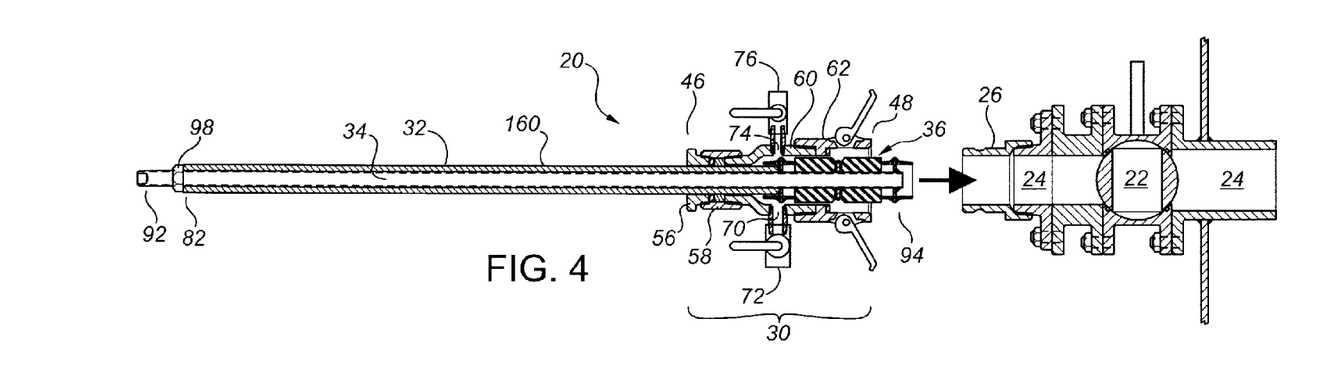
FIG. 4 is a longitudinal section view of the exemplary embodiment of the apparatus depicted in FIG. 1, a valve and a conduit, showing the apparatus in preparation for being connected with the valve.

First, the apparatus (20) is assembled for use. The tube (32), the rod (34), the seal assembly (34), the proximal collar (38) and the distal collar (40) will typically be preassembled as a tube assembly (160) having a tube assembly proximal end (162) and a tube assembly distal end (164). As a result, assembling the apparatus (20) may typically be accomplished by inserting the tube assembly proximal end (162) into the housing (30) at the housing distal end (48) and pulling the tube assembly (160) through the housing bore (32) in a proximal direction until the proximal collar (38) contacts the crossover coupling (60).

Second, the valve (22) is closed or the valve (22) is inspected to confirm and ensure that it is closed.

Figure 5:
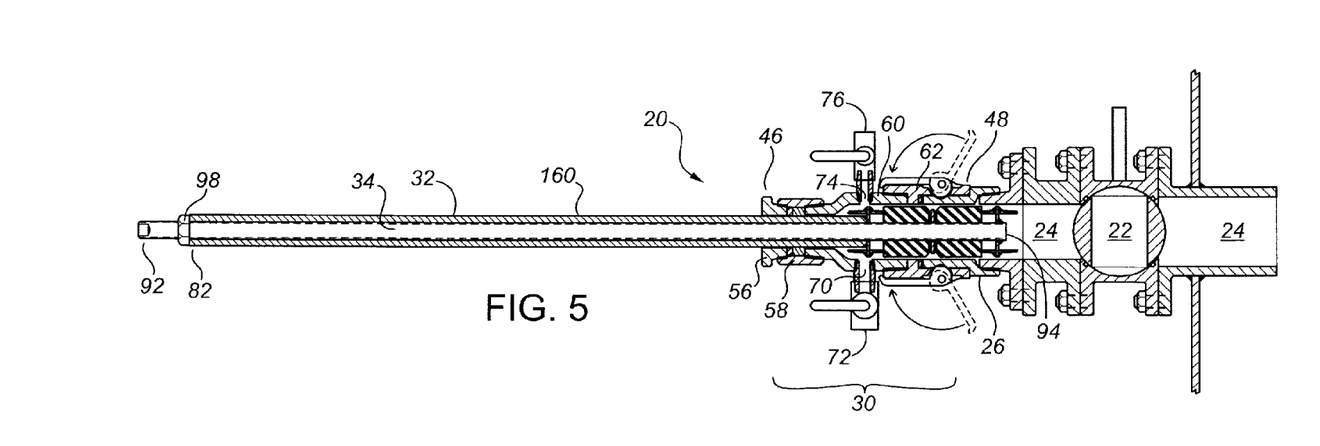
FIG. 5 is a longitudinal section view of the exemplary embodiment of the apparatus depicted in FIG. 1, a valve and a conduit, showing the apparatus being connected with the valve with the valve fully closed.

Third, the apparatus (20) is connected directly or indirectly to the valve (22) by connecting the camlock coupling (62) on the housing (30) with a complementary camlock coupling (26) on or associated with the valve (22).

Figure 6:
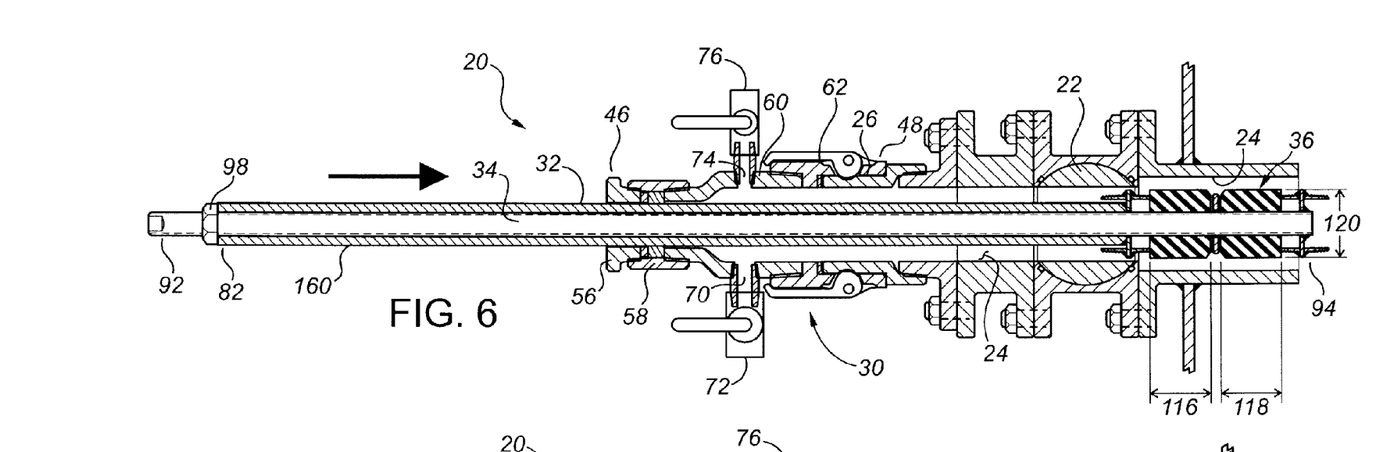
FIG. 6 is a longitudinal section view of the exemplary embodiment of the apparatus depicted in FIG. 1, a valve and a conduit, showing the apparatus connected with the valve and the tube assembly being advanced in the distal direction with the valve fully open.

Fourth, the valve (22) is opened fully and the tube assembly (160) is advanced through the housing bore (54) in a distal direction until only a short length of the tube assembly (160) protrudes from the hexagonal plug (56).

Figure 7:
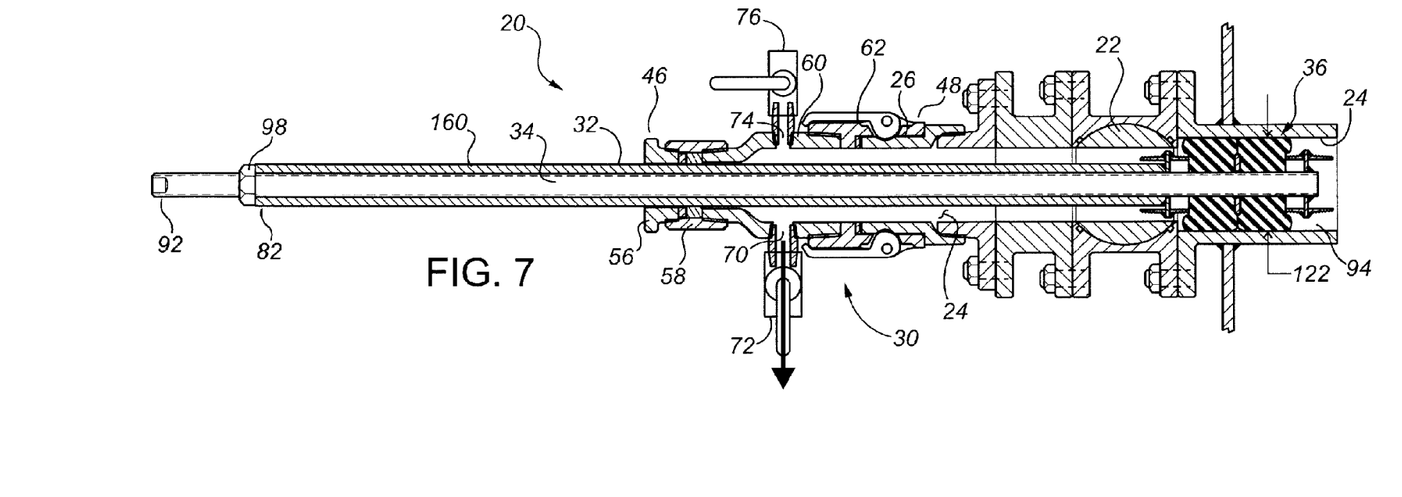
FIG. 7 is a longitudinal section view of the exemplary embodiment of the apparatus depicted in FIG. 1, a valve and a conduit, showing the seal assembly actuated to seal the conduit and one of the auxiliary port valves open to allow draining of the apparatus.

Fifth, the threaded nut (98) is turned with a wrench in order to move the rod (34) axially in a proximal direction, thereby applying an axial setting force to the seal assembly (36) and causing the seal elements (110, 112) to expand toward their expanded maximum diameter (122) until the seal assembly (36) is fully actuated to seal the conduit (22) upstream of the valve (24).

Sixth, one of the auxiliary port valves (72, 76) may be temporarily opened in order to drain the apparatus (20) of fluid.

Seventh, the tube assembly (160) may be give a slight tug to confirm that the seal assembly (36) is actuated properly to seal the conduit (24).

Figure 8:
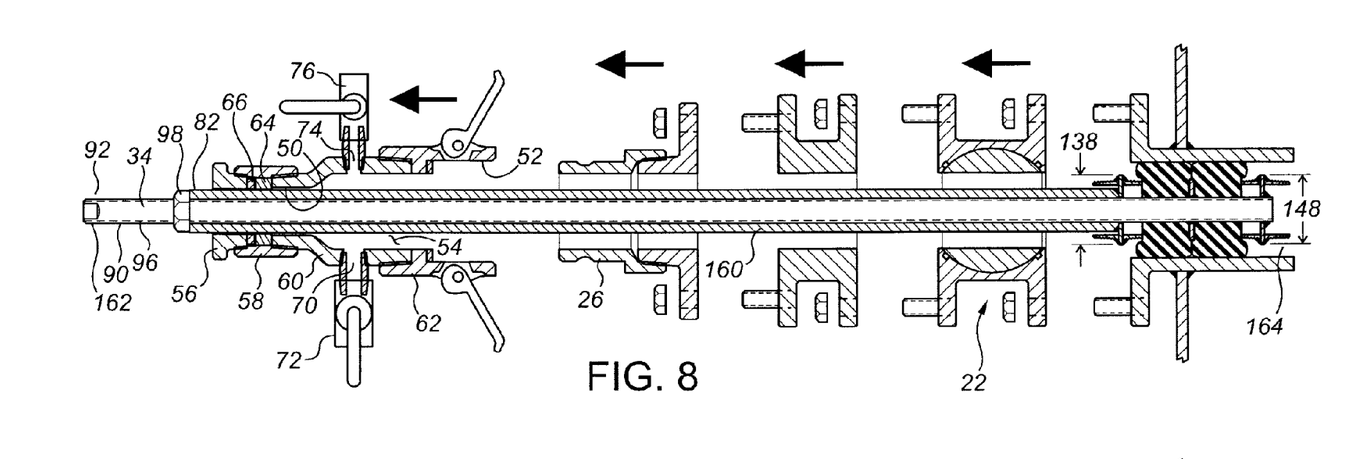
FIG. 8 is a longitudinal section view of the exemplary embodiment of the apparatus depicted in FIG. 1, a valve and a conduit, showing the housing being removed from the valve and the valve being removed from the conduit, with the tube assembly remaining in place sealing the conduit.

Eighth, the housing (30) is removed from the valve (22) while leaving the tube assembly (160) in place sealing the conduit (24), by uncoupling the camlock coupling (62) and sliding the housing (30) along the tube assembly (160) in a proximal direction.

Figure 9:
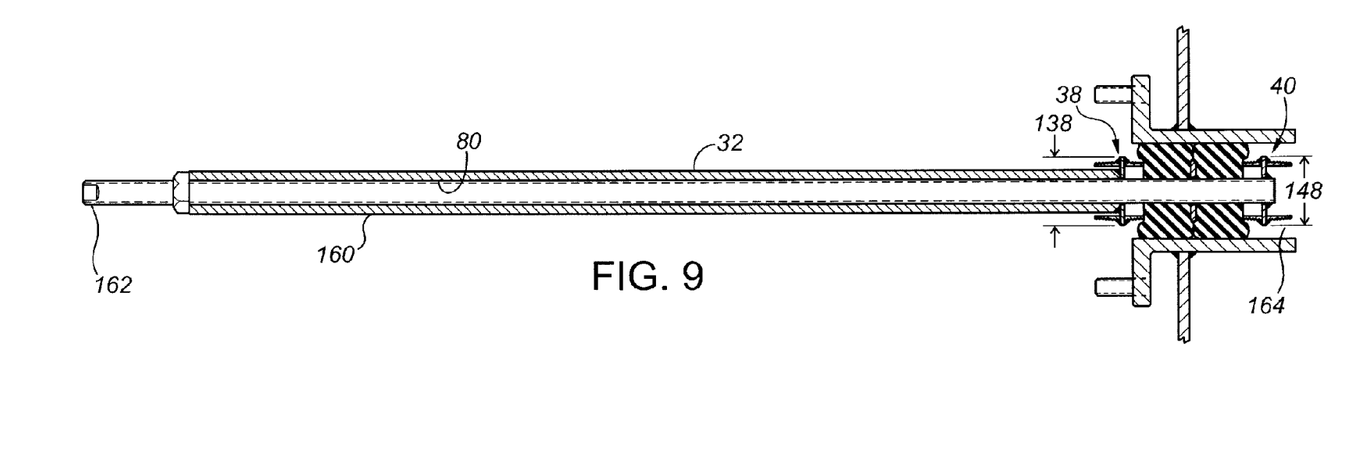
FIG. 9 is a longitudinal section view of the exemplary embodiment of the tube assembly depicted in FIG. 1 and a conduit, showing the tube assembly in place sealing the conduit with the housing having been removed from the valve and the valve having been removed from the conduit, ready for the installation of a new valve on the conduit.

Ninth, the valve (22) is removed from the conduit (24) and a fully open new valve (not shown) is installed on the conduit (24).

Tenth, the housing (30) of the apparatus (20) is connected with the new valve (not shown) by reassembling the housing (30) and the tube assembly (160) while the tube assembly (160) remains in place sealing the conduit (24) and connecting the camlock coupling (62) with a complementary camlock coupling (not shown) on the new valve (not shown).

Eleventh, the threaded nut (98) is turned with a wrench in order to move the rod (34) axially in a distal direction, thereby releasing the axial setting force and causing the seal elements (110, 112) to collapse toward their unexpanded minimum diameter (120) until only a short length of the rod (34) extends from the threaded nut (98).

Twelfth, the tube assembly (160) is retracted through the housing bore (54) in a proximal direction until the proximal collar (38) contacts the crossover coupling (60).

Thirteenth, the new valve (not shown) is fully closed and the apparatus (20) is removed from the new valve (not shown).

Fourteenth, the new valve (not shown) and the conduit (24) are checked for leaks.

In this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The embodiments of the invention in which an exclusive property or privilege is claimed are defined as follows:

1. An apparatus for sealing a conduit comprising:
   (a) a housing, the housing defining a housing bore and having a housing proximal end and a housing distal end, wherein the housing distal end is adapted to be connectable with a fitting associated with the conduit;
   (b) a tube for reciprocably extending through the housing bore, the tube defining a tube bore and having a tube proximal end and a tube distal end;
   (c) a rod reciprocably extending through the tube bore, the rod having a rod outer surface, a rod proximal end, and a rod distal end, wherein the housing bore, the tube and the rod define an axis of the apparatus, wherein the rod distal end protrudes from the tube distal end;
   (d) a seal assembly slidably surrounding the rod outer surface between the tube distal end and the rod distal end, wherein the seal assembly is comprised of at least one seal element which expands radially in response to an axial setting force being applied thereto, the seal assembly having a seal assembly proximal end and a seal assembly distal end;
   (e) a proximal collar associated with the tube distal end, for engaging with the seal assembly proximal end, wherein the proximal collar has a proximal collar outer surface, a proximal collar proximal end, and a proximal collar distal end, wherein at least a portion of the proximal collar outer surface is textured, wherein the proximal collar is comprised of a proximal collar flange which extends radially from the proximal collar outer surface, and wherein the proximal collar flange is positioned between the proximal collar proximal end and the proximal collar distal end;
   (f) a distal collar associated with the rod distal end, for engaging with the seal assembly distal end, wherein the distal collar has a distal collar outer surface, a distal collar proximal end, and a distal collar distal end, wherein at least a portion of the distal collar outer surface is textured, wherein the distal collar is comprised of a distal collar flange which extends radially from the distal collar outer surface, and wherein the distal collar flange is positioned between the distal collar proximal end and the distal collar distal end;
wherein moving the rod axially relative to the tube in a proximal direction results in the axial setting force being applied to the seal assembly by the proximal collar and the distal collar as the seal assembly is compressed between the proximal collar and the distal collar.

2. The apparatus as claimed in claim 1 wherein the seal assembly is comprised of a plurality of seal elements.

3. The apparatus as claimed in claim 2 wherein the plurality of seal elements is comprised of an elastomeric proximal seal element and an elastomeric distal seal element.

4. The apparatus as claimed in claim 3 wherein the proximal seal element and the distal seal element each have an unexpanded minimum diameter and an expanded maximum diameter and wherein an expansion ratio between the expanded maximum diameter and the unexpanded minimum diameter for each of the proximal seal element and the distal seal element is greater than 1.4:1.

5. The apparatus as claimed in claim 4 wherein the unexpanded minimum diameter of each of the proximal seal element and the distal seal element is no greater than 7 centimeters.

6. The apparatus as claimed in claim 5 wherein the expanded maximum diameter of each of the proximal seal element and the distal seal element is at least 10 centimeters.

7. The apparatus as claimed in claim 4 wherein the expanded maximum diameter of each of the proximal seal element and the distal seal element is at least 10 centimeters.

8. The apparatus as claimed in claim 4 wherein the seal assembly is further comprised of a spacer positioned between the proximal seal element and the distal seal element.

9. The apparatus as claimed in claim 8 wherein the spacer has a spacer diameter and wherein the spacer diameter is less than the unexpanded minimum diameter of each of the proximal seal element and the distal seal element.

10. The apparatus as claimed in claim 9 wherein the unexpanded minimum diameter of each of the proximal seal element and the distal seal element is no greater than 7 centimeters and wherein the spacer diameter is between 6 centimeters and less than 7 centimeters.

11. The apparatus as claimed in claim 8 wherein the proximal seal element has a proximal seal element length, wherein the distal seal element has a distal seal element length, wherein the proximal seal element length is greater than the unexpanded minimum diameter of the proximal seal element, and wherein the distal seal element length is greater than the unexpanded minimum diameter of the distal seal element.

12. The apparatus as claimed in claim 4 wherein the proximal collar flange has a proximal collar flange diameter, wherein the proximal collar flange diameter is no greater than the unexpanded minimum diameter of the proximal seal element, wherein the distal collar flange has a distal collar flange diameter, and wherein the distal collar flange diameter is no greater than the unexpanded minimum diameter of the distal seal element.

13. The apparatus as claimed in claim 12 wherein the proximal collar flange diameter is equal to the unexpanded minimum diameter of the proximal seal element and wherein the distal collar flange diameter is equal to the unexpanded minimum diameter of the distal seal element.

14. The apparatus as claimed in claim 12 wherein the unexpanded minimum diameter of each of the proximal seal element and the distal seal element is no greater than 7 centimeters.

15. The apparatus as claimed in claim 12 wherein the expanded maximum diameter of each of the proximal seal element and the distal seal element is at least 10 centimeters.

16. The apparatus as claimed in claim 15 wherein the expanded maximum diameter of each of the proximal seal element and the distal seal element is at least 10 centimeters.

17. The apparatus as claimed in claim 1, wherein the seal assembly is comprised of a proximal seal element and a distal seal element, wherein the proximal seal element and the distal seal element each have an unexpanded minimum diameter and an expanded maximum diameter, and wherein the seal assembly is further comprised of a spacer positioned between the proximal seal element and the distal seal element, and wherein the spacer is a flat metal washer.

18. The apparatus as claimed in claim 17 wherein the spacer has a spacer diameter and wherein the spacer diameter is less than the unexpanded minimum diameter of each of the proximal seal element and the distal seal element.

19. The apparatus as claimed in claim 18 wherein the unexpanded minimum diameter of each of the proximal seal element and the distal seal element is no greater than 7 centimeters and wherein the spacer diameter is between 6 centimeters and less than 7 centimeters.

20. The apparatus as claimed in claim 17 wherein the proximal seal element has a proximal seal element length, wherein the distal seal element has a distal seal element length, wherein the proximal seal element length is greater than the unexpanded minimum diameter of the proximal seal element, and wherein the distal seal element length is greater than the unexpanded minimum diameter of the distal seal element.

21. The apparatus as claimed in claim 17 wherein the proximal seal element and the distal seal element are comprised of an elastomeric material.

* * * * *